United States Patent [19]
Romero-Vargas

[11] Patent Number: 5,513,808
[45] Date of Patent: May 7, 1996

[54] THERMOELECTRICAL INSULATION FOR HIGH TEMPERATURES AND ELECTRIC CURRENTS MANUFACTURED FROM AMORPHOUS NATURAL GRAPHITE

[76] Inventor: Luis M. Romero-Vargas, Montes Altos #610-A Col., Residencial San Agustin, San Pedro Garza Garcia, N.L., Mexico, MFX. 662

[21] Appl. No.: 262,275

[22] Filed: Jun. 20, 1994

[51] Int. Cl.⁶ .................................................. B02C 23/08
[52] U.S. Cl. .......................... 241/24.1; 241/27; 241/30; 136/201
[58] Field of Search .................... 136/201; 241/23, 241/24, 25, 27, 29

[56] References Cited

U.S. PATENT DOCUMENTS 4,533,086  8/1985  Junttila ............................ 241/20 X
4,659,022  4/1987  Seider et al. ...................... 241/24 X
4,728,043  3/1988  Ersdal et al. ........................ 241/14
5,084,254  1/1992  Golley ............................... 241/24 X

*Primary Examiner*—Timothy V. Eley
*Attorney, Agent, or Firm*—Laurence R. Brown

[57] ABSTRACT

This invention refers to improvements to thermoelectrical insulation for high temperatures and electric currents manufactured from amorphous natural graphite, and more specifically to a procedure that consists of the grinding, mixing and classifying by particle size the raw graphite previously selected on the basis of its components of carbon-ash, from which the final product is obtained.

5 Claims, 2 Drawing Sheets

THERMOELECTRICAL INSULATION FOR HIGH TEMPERATURES AND ELECTRIC CURRENTS MANUFACTURED FROM AMORPHOUS NATURAL GRAPHITE

BACKGROUND OF THE INVENTION

Through the analysis of the physical-chemical characteristics of the different types of solid carbon from natural sources, it was established and proven, by this invention that, certain types of amorphous or cryptocrystalline natural graphites with high contents of ash are better thermoelectrical insulators for high temperatures and electric currents than other carbon products used in this field.

The ashes or impurities in carbon, are composed of refractory elements and not good electrical conductors such as silica and alumina that in the case of amorphous natural graphite are found intercalated in superficial ionic contact and uniformly dispersed with individual particles of carbon.

When you grind, mix and classify by particle size the raw graphites previously selected on the basis of their carbon-ash components, you obtain the appropriate thermoelectrical insulation for each specific application in accordance to the operating conditions and the type of product you want to insulate.

The physical-chemical characteristics of this insulation module a better yield than those conventionally used at working temperatures of up to 3500° C. and electric currents of 1000 AMPS/$CM^2$ due principally to its lower thermal and electric conductivity, higher density and mechanical strength, lower porosity and higher resistance to oxidation.

Natural graphite is becoming more important in modern technology because of its particular properties that make it more versatile in its applications and it is present in almost all industrial areas worldwide.

There exists in nature, based on its geological formation, the following three distinct varieties or classifications of natural graphite.

a) Flakes

These have the shape of scales or laminations and are found in metamorphic rocks, such as crystalline limestone, gneisses and schists where each flake is separated individually and has been crystalized in the rock.

b) Crystalline

This variety found the form of veins more or less well defined or in an accumulation of pockets in contact with intrusions of pegmatites limestones and schists.

Its crystaline form is found laminar or foliated in the shape of leaves and columnar or fibrous.

c) Amorphous

This is found in the form of small particles distributed more or less uniformly in weak metamorphic rocks such as shales or schists or in beds or almost pure graphite.

These three types of graphite are distinguished among themselves by their content of fixed carbon or purity and their crystaline structure.

Graphite in highly crystaline flakes, has highest quality with purity levels from fixed carbon of 94–98% followed by crystalline graphite with 85–94% and finally by amorphous graphite which roams between 50 and 85%.

At present, the growing demand of greater volumes of graphite with higher purity has led to the development of many and varied processes to reduce or eliminate the ashes and therefore increase the % of pure carbon mineral.

In the case of the crystalline and flake graphites, the purification processes are based on selection, classification and flotation with which you can achieve purities no greater than 94% of fixed carbon making it necessary to adapt physical-chemical treatments to increase the purity up to 99.9%.

With amorphous graphite, you can only achieve purities of 99% using physical-chemical treatments since in the processes of separation by flotation or classification it is not possible to increase purity substantially because the ash is intrinsically bound to the carbon.

Graphites either artificial (synthetic) as well as natural have the following properties that vary depending on their purity:

1- Good electric conductivity.
2- Low thermal conductivity.
3- Mechanical stability at high temperatures.
4- Resistance to severe thermal shock.
5- Low thermal expansion.
6- Strength increasing with temperature.
7- Ample ranges of thermal conductivity.
8- Resistance to abrasion and erosion.
9- Resistance to practically all corrosion in ample ranges of temperature.
10- Self lubricating.
11- Low adherance to metals.
12- Antimagnetic.
12- Moldable and machinable.

The market for natural and artificial graphites is found mainly in the following industries:

1) Lubricants and greases for high temperatures.
2) Crucibles for handling molten metals.
3) Printed electric circuits.
4) Refractory bricks.
5) Electrodes for dry batteries.
6) Mold washes.
7) Packings.
8) Electrical conductors.
9) Flexible laminated graphite.
10) Carbon risers for steel.
11) Pencils.
12) Paints.

For a long time, industry has demanded substitutes, and in some cases can not replace high purity graphite principally because of its properties of:

Thermal and electric conductivity.
Resistance to thermal shock.
Resistance to chemical attack from reagents at high concentrations.

In the specific case of amorphous natural graphite without any physical-chemical treatment for purification, its market is restricted to the iron and steel industry as a carbon riser or in the manufacturing of coatings to remove castings from molds.

In this application the user normally requires a minimum of 70% of fixed carbon, which makes those graphites with lower carbon contents to have no demand unless they are subjected to treatments for improvement to market within the industrial areas that require higher carbon purities.

In natural graphites, the ash or impurity of the carbon is made up mainly of silica ($SiO_2$) and alumina ($Al_2O_3$) elements that are highly refractory and not good electrical conductors and that together form 70–75% of total impurities.

These ashes are considered contaminants and are therefore detrimental to the present applications previously described that demand a high carbon content, good thermoelectrical conductivity and lubricating capability.

On the basis of the comparison and analysis of the physical-chemical properties of amorphous natural graphite with high ash content and the carbon products presently used as thermoelectrical insulators for high temperatures and electric currents, it was possible to establish and prove, that high ash graphite has a higher capacity for thermoelectrical insulation than those given by petroleum and metallurgic cokes.

However, with none of the previously discussed graphites is it possible to manufacture a thermoelectrical insulator for high temperatures and electric currents, due to their characteristics, principally because in all of the cited graphites the ash is separated from the carbon.

It is therefore, the objective of the present invention to give to industry in general a product that has advantages that make it different from the existing products, and can therefore be used advantageously as a thermoelectrical insulator, different from the other insulators manufactured from a carbon base, of which we can provide the following:

Lower thermal conductivity at high temperatures during heating and good conductivity during the cooling process.

Higher density and resistance to oxidation.

Higher electrical resistance during and after the heating process.

Less environmental contamination due to sulfur gas emissions.

Less wastage in handling.

Less use of energy for heating the insulated product.

Less volume or thickness of insulation.

DESCRIPTION OF THE INVENTION

Figure 1:
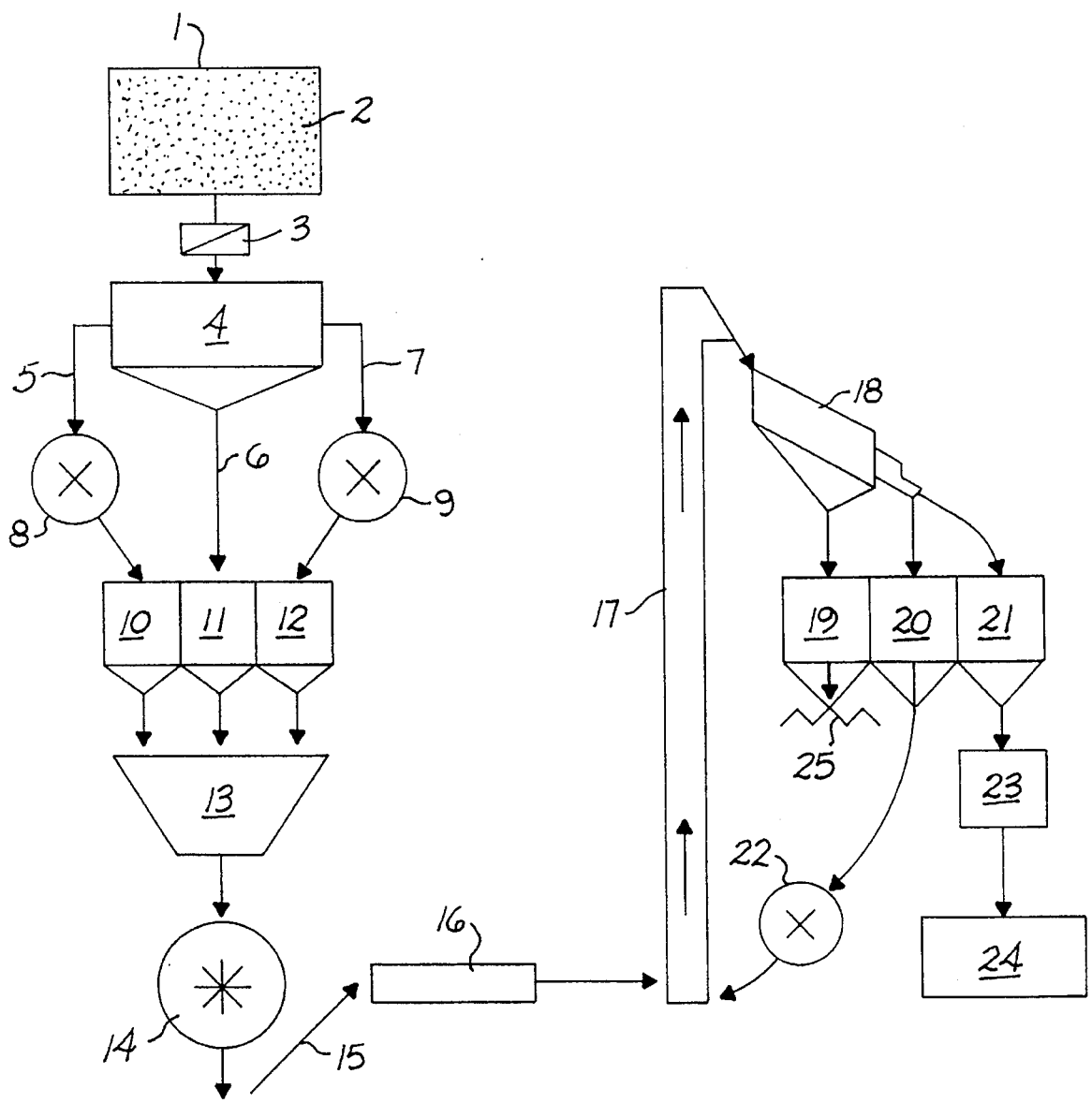
FIG. 1, shows a schematic diagram of the manufacturing process.

With reference to said FIG. 1, this process begins by putting in a deposit (1), natural graphite in bulk (2), that must be amorphous or cryptocrystalline because with this type of graphite the ashes are intercalated and ionically adhered in small particles to the carbon, while in the others, the ashes are disseminated in the carbon and not bound to it.

The bulk graphite (2) is transported by means of a conveyor belt (3) that feeds a vibrating screen (4) in which the product is separated by particle size (5, 6 and 7).

Product (5) is graphite in sizes from 3 to 6" product (6) contains particles that range from 1½" to dusk and product (7) has particles from 1½" to 3".

Product (5) is fed by gravity to a jaw crusher (8) where the lumps are reduced in size to have a particle size of 1½" to dust and then passes to storage hopper (10).

Product (6) passes directly from the screen (4) to a storage hopper (11).

Product (7) is crushed in a hammer mill (9) to obtain particles from 1½" to dust and is deposited by gravity to hopper (12).

Through a chemical analysis, the content of carbon and ashes of the three products stored in hoppers (10, 11 and 12) is determined. And on the basis of the results, the % of weight required is calculated in order to obtain the mix of carbon and ashes most adequate for a specific application.

Once the % of the mix of products is defined, these are individually weighed and added, by gravity, and individually weighed in a into weighing hopper (13).

Then the three products are fed, by gravity, to a mixer (14) where the mix is homogenized.

The mixed products are transported by means of a conveyor belt (15) to a rotary dryer (16) where the moisture content of the mix is reduced to 2% of the weight, maximum.

The dryer (16) discharges the mix of products by gravity to a bucket elevator (17) that feeds the graphite to a vibratory screen (18) with three tiers where it is separated by particle size into fine, coarse and finished product and fed by gravity to hoppers (19, 20 and 21) respectively.

The finished product (21) is discharged from its hopper by gravity to the sacker (23) and from there transported to the finished product area (24).

The fine product (19), is discharged to another system for the manufacture of another product.

The product in the coarse product hopper (20), is fed by gravity to a pulverising hammer mill (22) where the size of the particles is reduced and these are recirculated by means of the bucket elevator (17) and the vibratory screen (18) until they become finished product.

Parameters that must be taken into account in the determination of a carbon-ash mix as seen from the economic and greater yield point of view are now discussed.

1) High ash content (40%) offers a higher capacity of electrical and thermal insulation, however, the milling cost is high and in some cases the high ash content may affect the product it is supposed to insulate at operating temperatures of over 1200° C.

2) Low ash content (25%) and high carbon (75%) products are more economic to produce but their electrical and thermal resistance are lower that those of paragraph 1 with the advantage of not having the risk of affecting the product to be insulated.

3) The smaller particles of milled graphite are the ones that contain the higher concentrations of ashes since the mineral fractures at the weakest point which is the carbon.

4) Sulfur contents higher than 1.0% affect the thermal expansion coefficient at 1200° C. and can produce fragmentation or pulverization of the carbon in the insulation.

5) Laminar amorphous graphites generate higher percentages of superfine particles in the milling operation.

6) The original electrical resistance of graphites with low contents of graphitic carbon is reduced with temperature.

EXAMPLES OF PREPARATION OF INSULATION

Example 1): INSULATION MADE FROM AMORPHOUS NATURAL GRAPHITE WITH THREE COMBINATIONS OF CARBON-ASH.

CHEMICAL ANALYSIS OF THE BULK GRAPHITE

| % | PRODUCT | | |
|---|---|---|---|
| | A | B | C |
| FIXED CARBON | 70.0 | 60.0 | 65.0 |
| ASHES | 28.0 | 38.0 | 32.0 |
| VOLATILE MATERIAL | 2.0 | 2.0 | 3.0 |
| SULFUR | 0.05 | 0.01 | 0.09 |
| MOISTURE | 5.0 | 4.5 | 6.0 |

TYPICAL ANALYSIS OF AMORPHOUS NATURAL GRAPHITE ASH

| COMPOUND | % |
|---|---|
| $SiO_2$ | 53.62 |
| $Al_2O_3$ | 23.35 |
| $Fe_2O_3$ | 9.63 |
| CaO | 5.10 |
| $K_2O$ | 2.90 |
| MgO | 2.80 |
| $TiO_2$ | 1.00 |
| $SO_3$ | 0.93 |
| NaO | 0.67 |
| TOTAL | 100.000 |

Particle size of products A, B and C: 1½" to dust.

1. Mix
   Mix 40% of Product A
   20% of Product B
   40% of Product C
2. The mix of the three products is fed to the dryer where the moisture is reduced to 1.2%.
3. By means of grinding and screening you obtain particles that go from 0.3 to 2.0 mm as the finished product or thermoelectrical insulation with the following physical-chemical characteristics:

| Fixed Carbon | 66.000% |
|---|---|
| Ashes | 31.600% |
| Volatile Material | 2.400% |
| Sulfur | 0.040% |
| Moisture | 1.200% |
| Specific Resistance | 0.105 OHM-CM. |
| Apparent Density | 1.28 $GR/CM^3$ |
| Particle Size | 0.3–2.0 MM |
| Morphology | GRANULAR |
| True Density of amorphous Natural Graphite | 2.10 $GR/CM^3$ |
| True Density of the Ash | 2.66 $GR/CM^3$ |
| Graphitic Carbon Content | 24.0% |

Example 2): Using the same combination of carbon-ash in the mix and following the same steps as in Example 1), but grinding to acheive smaller particles, we get the following characteristics of the insulation:

| Particle Size | 0.250–0.850 MM |
|---|---|
| Specific Resistance | 0.125 OHM-CM |
| Apparent Density | 1.35 $GR/CM^3$ |

From the two examples mentioned it can be seen that the behavior of both the electric resistance as well as the density increase when the particle size is reduced.

This follows general physical principles amply proven.

COMPARISON OF PROPERTIES OF THERMOELECTRICAL INSULATION MADE FROM AMORPHOUS NATURAL GRAPHITE VS. THOSE MADE FROM OTHER CARBON PRODUCTS THAT ARE PRESENTLY IN USE.

| PROPERTIES (DRY BASE) | AMORPHOUS NATURAL GRAPHITE | CALCINED PETROLEUM COKE | METALLURGICAL COKE (TYPE 1) | METALLURGICAL COKE (TYPE 2) |
|---|---|---|---|---|
| FIXED CARBON | 66.0 | 98.4 | 74.3 | 86.3 |
| ASHES | 31.6 | 1.1 | 23.0 | 11.4 |
| VOLATILE MATERIALS | 2.4 | 0.5 | 3.5 | 2.3 |
| SULFUR | 0.04 | 0.85 | 0.87 | 0.90 |
| APPARENT DENSITY (GR/CM3) | 1.35 | 0.83 | 0.68 | 0.76 |
| SPECIFIC RESISTANCE (OHM-CM) | 0.125 | 0.035 | 0.052 | 0.045 |
| PARTICLE SIZE (MILLIMETERS) | 0.250 TO 0.850 | 0.250 TO 0.850 | 0.250 TO 0.850 | 0.250 TO 0.850 |

As can be seen from the table above, the graphite insulation compared to that from metallurgical coke Type "1" has the following advantages:

1. The Ohmic resistance to a flow of current is 2.4 times as great which makes its electrical insulating capacity superior.
2. The content of ashes or refractory elements is 37% higher which implies a better thermal protection for the product being insulated.
3. The apparent density is 1.98 times greater which results in a lower porosity and higher mechanical strength.
4. Because it is graphite, the resistance to oxidation is 100° C. higher.
5. Because it is a better thermal insulator, the surface temperature is lower and therefore has fewer oxidation losses.

6. Because of its mechanical properties, its resistance to losses due to handling is greater.
7. Particle size is more controllable within the narrow limits of size.
8. The emissions of sulfur gases is almost nil.

With respect to petroleum based coke and metallurgical coke Type "2" whose fixed carbon contents are higher, the advantages of graphite insulation are even superior to those mentioned above.

Insulations with high carbon contents, when exposed to temperatures above 1500° C. experience a reduction of its original ohmic resistance due to the effect of the transformation of carbon into graphite, which does not happen with the natural graphite insulation because during its natural formation this transformation has taken place and because of the effect of its low carbon content and high ashes, its electrical resistance remains above that of other carbon insulators.

DESCRIPTION AND EVALUATION OF AN EXPERIMENTAL TEST TO EVALUATE THE PERFORMANCE OF AMORPHOUS NATURAL GRAPHITE INSULATION VS. METALLURGICAL COKE INSULATION.

Figure 2:
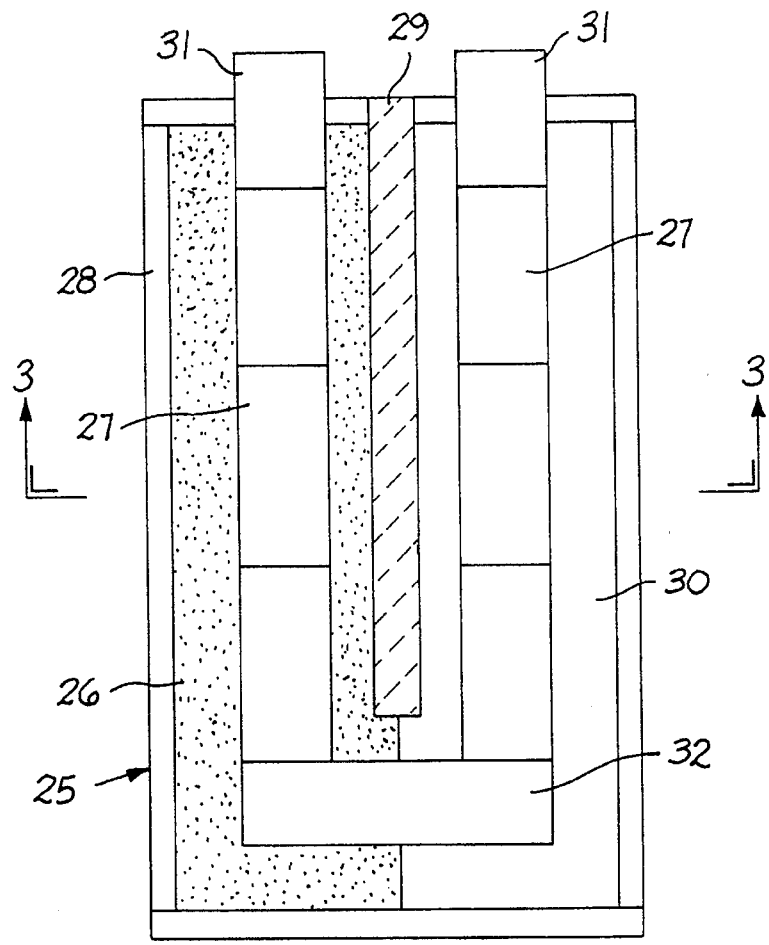
FIG. 2, shows a plain view of a test furnace.
Figure 3:
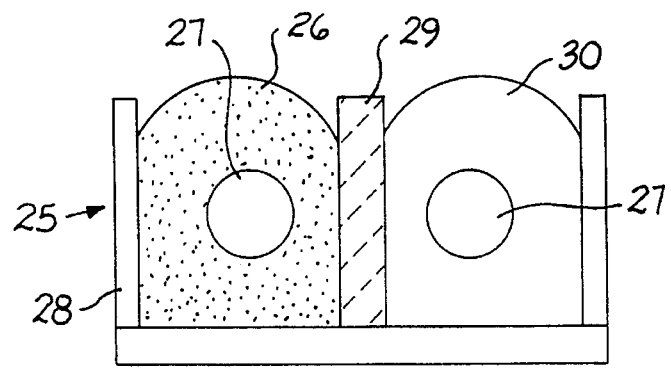
FIG. 3, shows and elevation view cross section of the test furnace taken along lines A–A' of FIG. 2.

In order to carry out this test, a graphitation, through electric current, furnace (25) is used as shown on FIG. 2 in a plan view and section (A-A')shown in FIG. 3.

The furnace (25) is comprised of two synthetic graphite electrodes (31) that carry an electric current through the charge (27) in a closed circuit.

The charge (27) is made up of solid pieces of carbon that form a closed circuit and function as electric resistances as current passes through them.

The two columns of the charge (27) are divided by a central wall 29 made of refractory brick to prevent the electric current from crossing from one section to the other before the circuit is closed by the horizontal piece (32).

The charge (27) in the left hand section of the furnace (25) is covered with amorphous natural graphite insulation (26) while in the other section metallurgical coke insulation (30) is used.

The particle size for both insulations (26 and 30) is from 0.250 to 0.850 mm with the same physical properties described in the aforesaid Table of Properties (see page 15).

Both insulations (26) and (30) are contained within the furnace (25) by means of blocks or lateral walls (28).

The graphite insulation (26) is separated from the coke insulation (30) by a central wall (29) as can be seen in section the FIG. 3 (A–A') of the furnace (25) in FIG. 2, to determine the difference in the insulating capacity of one with respect to the other.

To carry out the test, a transformer (not shown in FIG. 2) is used to pass an electric current through the graphite electrodes (31) at a rate of 550 amps/cm$^2$ all along the circuit made up of the charge (27) during 8.0 continuous hours. The current passing through generates a gradual heating of the whole charge (27) until it reaches 3000° C., the temperature needed to achieve the total transformation of carbon to graphite.

The results of the test were as follows:

1. The pieces of the charge (27) on the left side of the furnace (25) that were covered with the graphite insulation (26) reached the 3000° C. one hour before the other section of the charge (27) that was covered with the metallurgical coke insulation (30) due to the fact that part of the current supplied was deflected in a greater proportion by the coke insulation (30) in comparison to that which escaped through the graphite insulation (26) because of the differential in electrical resistance and insulating thermal capacity between the two.

In the section of the furnace (25) covered by the metallurgical coke insulation (30) a greater loss of heat was seen during the heating process than that which was seen in the section covered with the graphite insulation (26). This could be proven by the differential temperatures registered for both insulations. The coke insulation (30) reached temperatures of up to 1800° C. while the graphite insulation (26) remained under 600° C. at a distance of 4" from the charge (27).

2. During the cooling process of the furnace (25), the side covered with the graphite insulation (26) cooled faster than the metallurgical coke insulation (30) due to the thermal conductivity capacity of graphite at under 1800° C.

After 72 hours of cooling, the pieces of the charge (27) covered with graphite insulation (26) registered a temperature of 650° C. compared to 950° C. for the other side.

3. The electrical resistance of the graphite insulation (26) was maintained without changes (0.125 Ohm-cm) while that of the coke insulation (30) dropped from 0.052 to 0.038 Ohm-cm.

4. The "wastage" due to the generation of particles under 0.250 mm in insulation (26) was 0.5% while for insulation (30) it was 12%.

5. The sulfur gas emissions (odor) was notorious in the coke insulation (30) and almost nil in the graphite (26).

6. Conclusions of the test:
   a) It is possible to reduce the volume of the graphite insulation (26) cover by 50 to 80%.
   b) The amount of energy required (KWH) to graphitize the charge in an furnace can be reduced by 25 to 40% using an amorphous natural graphite insulation.
   c) It is possible to eliminate the central (29) and lateral (28) walls of the furnace (25).
   d) The cooling time can be shortened by 30 to 50%.
   e) Contamination due to gases and dust is notably reduced and eases its control.
   f) The insulating properties of the graphite (26) remain stable and with little loss after being used in a graphitizing operation which allows it to be recycled 10 to 12 times while the metallurgical coke (30) can not be recycled more than 3 or 4 times.
   g) Through this test it was possible to confirm that in practice, the thermoelectrical insulation based on natural graphite, has a much higher performance than the coke based conventional insulations for high temperatures and electric currents.

What I claim is:

1. The method of manufacturing insulation from amorphous natural graphite comprising the steps of:

isolating graphite particles no longer than six inches in diameter with an ash content between 25% to 40%, separating the particles into three sizes, namely: (a) those from three to six inches in diameter, (b) those between one and a half to three inches in diameter, and (c) those less than three inches in diameter, establishing respective ash and carbon contents of the respective sized particles, and mixing the three sized particles in a proportion for meeting an insulation product specification.

2. The method of claim 1 further comprising the steps of:

grinding the mixed particles to a reduced diameter of from 0.3 to 2.0 mm to exhibit an electrical resistance of about 0.105 ohm-cm.

3. The method of claim 2 further comprising the step of reducing moisture of the mixed particles to no more than 2% before the grinding step.

4. The method of claim 2 further comprising the step of separating the ground mixed particles into fine, coarse and an intermediate finished product size having an electrical resistance of about 0.125 ohm-cm.

5. The method of claim 2 further comprising the step of increasing the apparent density of the particles to about 1.35 $gr/cm^3$.

* * * * *